(12) United States Patent
Wilkins

(10) Patent No.: US 11,761,541 B2
(45) Date of Patent: Sep. 19, 2023

(54) UNITIZED SEAL ASSEMBLY WITH AXIAL POSITIONER

(71) Applicant: AKTIEBOLAGET SKF, Gothenburg (SE)

(72) Inventor: John Arthur Wilkins, Chicago, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 149 days.

(21) Appl. No.: 17/460,892

(22) Filed: Aug. 30, 2021

(65) Prior Publication Data

US 2023/0066526 A1 Mar. 2, 2023

(51) Int. Cl.
| | |
|---|---|
| *F16J 15/3256* | (2016.01) |
| *F16C 33/78* | (2006.01) |
| *F16J 15/3208* | (2016.01) |
| *F16J 15/3232* | (2016.01) |

(52) U.S. Cl.
CPC ......... *F16J 15/3256* (2013.01); *F16C 33/783* (2013.01); *F16C 33/7886* (2013.01); *F16J 15/3208* (2013.01); *F16J 15/3232* (2013.01)

(58) Field of Classification Search
CPC .. F16J 15/3208; F16J 15/3232; F16J 15/3256; F16J 15/3264; F16J 15/3268; F16C 33/783; F16C 33/7883; F16C 33/7886
See application file for complete search history.

(56) References Cited

U.S. PATENT DOCUMENTS

| | | | | | |
|---|---|---|---|---|---|
| 2,153,499 | A | * | 4/1939 | Chievitz | F16C 33/7886 277/500 |
| 3,021,161 | A | * | 2/1962 | Rhoads | F16J 15/3256 277/423 |
| 3,135,518 | A | * | 6/1964 | Carson | F16J 15/3256 277/572 |
| 3,156,474 | A | * | 11/1964 | Nelson | F16J 15/3256 277/573 |
| 3,341,265 | A | * | 9/1967 | Paterson | F16C 33/7813 277/565 |
| 3,682,488 | A | * | 8/1972 | Matsushima | F16J 15/3256 277/573 |
| 3,762,726 | A | * | 10/1973 | Jornhagen | F16J 15/3256 277/575 |

(Continued)

*Primary Examiner* — Nicholas L Foster
(74) *Attorney, Agent, or Firm* — J-TEK LAW PLLC; Scott T. Wakeman; Mark A. Ussai

(57) ABSTRACT

A seal assembly is for sealing a bearing disposed between an inner shaft and an outer hub and includes an annular inner case having an axial section disposable about the shaft shoulder and a radial section extending radially outwardly from the axial section. An annular outer case is disposed about the inner case, has an axial section coupleable with the hub and a radial section extending radially inwardly from the outer case axial section and spaced axially from the inner case radial section. An elastomeric seal member is attached to the outer case radial section and has a sealing lip sealingly engaged with the axial section of the inner case. An annular positioner is coupled with the inner case and has a radial section engageable with the axial end of the bearing inner ring so as to locate the inner case at a desired position along the central axis.

18 Claims, 10 Drawing Sheets

(56) References Cited

U.S. PATENT DOCUMENTS

| | | | | |
|---|---|---|---|---|
| 4,285,526 | A * | 8/1981 | Klinteberg | F16J 15/3256 277/575 |
| 4,448,426 | A * | 5/1984 | Jackowski | F16J 15/3256 277/568 |
| 4,856,794 | A * | 8/1989 | Boyers | F16J 15/3268 277/565 |
| 5,082,294 | A * | 1/1992 | Toth | F16J 15/3256 277/930 |
| 5,201,528 | A * | 4/1993 | Upper | F16J 15/3256 277/400 |
| 5,211,406 | A * | 5/1993 | Katzensteiner | F16J 15/3256 277/572 |
| 5,286,038 | A * | 2/1994 | Abraham | F16J 15/3256 277/575 |
| 6,220,600 | B1 * | 4/2001 | Tripathy | F16J 15/3264 277/309 |
| 7,464,939 | B2 * | 12/2008 | Matsui | G01P 3/443 277/572 |
| 7,712,745 | B2 * | 5/2010 | Clark | F16J 15/3256 277/572 |
| 8,028,415 | B2 * | 10/2011 | Clark | F16J 15/3268 277/572 |
| 8,141,882 | B2 * | 3/2012 | Wang | F16J 15/3264 277/353 |
| 8,534,674 | B2 | 9/2013 | Maskaliunas et al. | |
| 8,734,022 | B2 | 5/2014 | Dittmar et al. | |
| 9,163,730 | B2 | 10/2015 | Maskaliunas et al. | |
| 9,914,326 | B2 * | 3/2018 | White | F16C 33/7886 |
| 10,208,801 | B1 | 2/2019 | Wang et al. | |
| 10,240,678 | B2 * | 3/2019 | Toth | F16J 15/3284 |
| 10,550,941 | B2 | 2/2020 | Maskaliunas | |
| 2008/0029967 | A1 * | 2/2008 | Nakagawa | F16J 15/3256 277/423 |

\* cited by examiner

UNITIZED SEAL ASSEMBLY WITH AXIAL POSITIONER

BACKGROUND OF THE INVENTION

The present invention relates to seals, and more particularly to unitized radial lip seal assemblies.

Unitized radial lip seal assemblies are known and generally include an inner case, an outer case and a radial lip seal member attached to one of the cases and sealing against the other case (i.e., the wear sleeve). The seal assembly may be used to seal an end of a bearing which rotatably couples an inner axle or shaft with an outer hub, with the outer case being coupled with the hub and the inner case being disposed about axle/shaft. In certain of these applications, the seal member is attached to the outer case and seals against the inner case or "wear sleeve", and often the seal assembly further includes an annular elastomeric bumper on the outer case which contacts a radial flange of the inner case.

Such a bumper maintains a desired axial spacing between the inner and outer cases and enables the seal assembly to be installed on a shaft by applying force axially on a radial flange of the inner case. Such installation force is transferred to the outer case through the bumper and the entire seal assembly is displaced axially until an inner end of the outer case contacts a radial shoulder or surface on the outer hub. Thereby, the components of the seal assembly, including the inner case, are located at a desired positions relative to the bearing.

SUMMARY OF THE INVENTION

In one aspect, the present invention is a seal assembly for sealing a bearing disposed between an inner shaft and an outer hub, the shaft or hub being rotatable about a central axis, the bearing having an inner ring with an axial end and an outer ring disposed about the inner ring and the shaft having a shoulder disposed against the axial end of the bearing inner ring. The seal assembly comprises an annular inner case having an axial section disposable about the shaft shoulder and a radial section extending radially outwardly from the axial section. An annular outer case is disposed about the inner case, has an axial section coupleable with the hub and a radial section extending radially inwardly from the axial section of the outer case and spaced axially from the radial section of the inner case. An elastomeric seal member is attached to the radial section of the outer case and has an annular primary sealing lip sealingly engaged with the axial section of the inner case. Further, an annular positioner is coupled with the inner case and has a radial section engageable with the axial end of the bearing inner ring so as to locate the inner case at a desired position along the central axis.

In another aspect, the present invention is again a seal assembly as described in the preceding paragraph and further comprising an annular elastomeric bumper having a first end attached to the radial section of the outer case and a second, free end spaced from the radial section of the inner case so as to form a labyrinth gap. Also, the radial section of the inner case has a radial length sized to radially overlap a radially-inner portion of the radial section of the outer case and a radially-outer portion of the outer case radial section is engageable by an installation tool to axially displace the outer case relative to the inner case.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
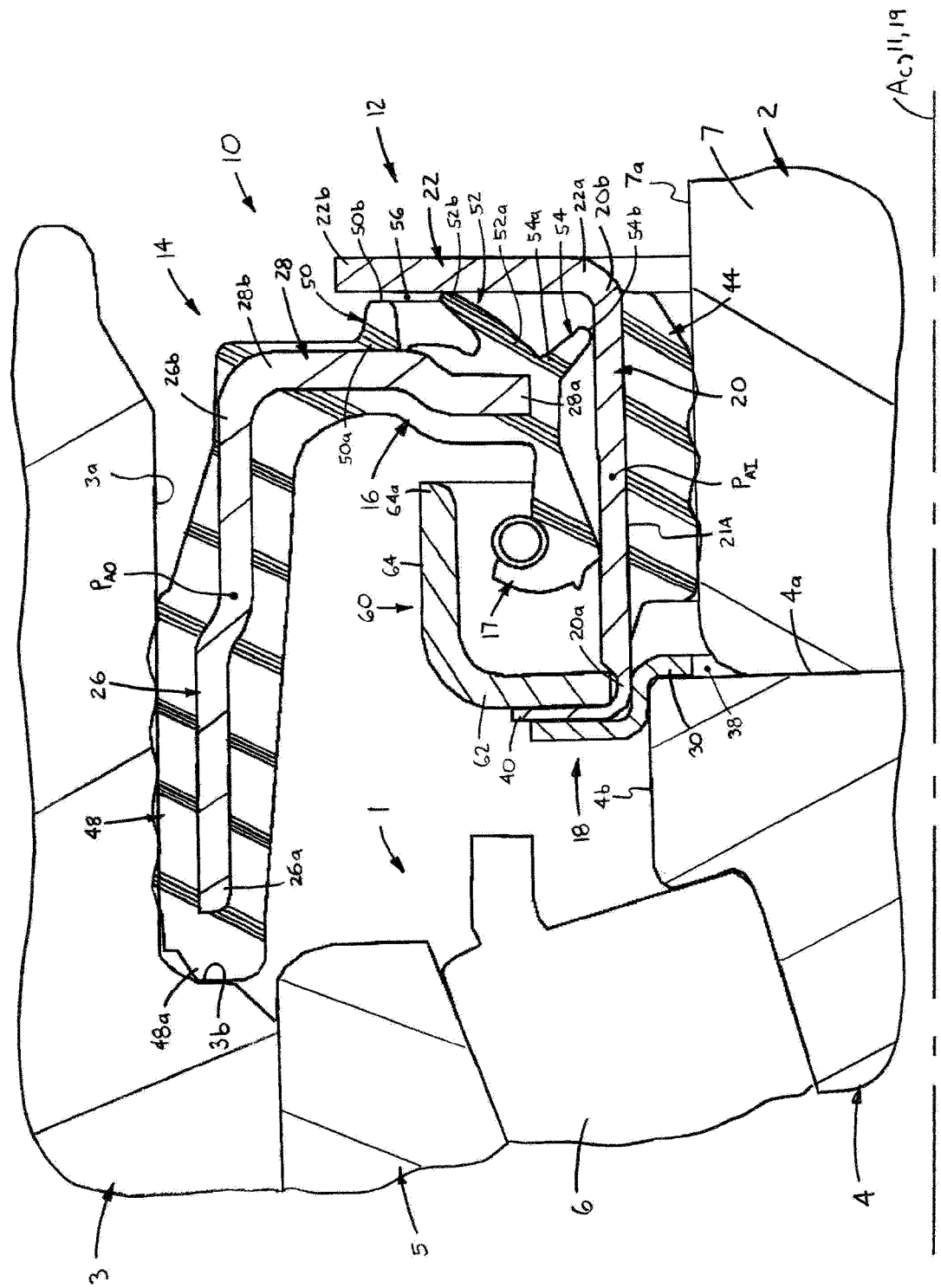
FIG. 1 is an axial cross-sectional view of an upper portion of a seal assembly in accordance with the present invention, shown installed within a shaft and hub assembly and adjacent to a bearing.

Certain terminology is used in the following description for convenience only and is not limiting. The words "inner" and "outer" refer to directions toward and away from, respectively, a designated centerline or a geometric center of an element being described, the particular meaning being readily apparent from the context of the description, and in particular the words "inner axial" and "outer axial" instead refer to directions along a central axis or centerline toward and away from, respectively, a bearing 1. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-10 a seal assembly 10 for sealing a bearing 1 disposed between an inner axle or shaft 2 and an outer hub 3, with either the shaft 1 or the hub 3 being rotatable about a central axis $A_C$. The bearing 1 has an inner ring 4 with opposing axial ends 4a (only one shown), an outer ring 5 disposed about the inner ring 4 and a plurality of rolling elements 6 (only one shown). The shaft 2 has a shoulder 7 disposed against one axial end 4a of the bearing inner ring 4, the shoulder 7 having an outer circumferential surface 7a. The seal assembly 10 is preferably a unitized seal assembly and basically comprises an inner annular case 12, an outer annular case 14 disposed about the inner case 12, an annular elastomeric seal member 16 coupled with the outer case 14 and an annular positioner 18 coupled with the inner case 12. The positioner 18 is configured to locate the inner case 12 at a desired position $P_{AI}$ (FIG. 1) along the central axis $A_C$.

More specifically, the inner case 12 functions as a wear sleeve and has an axial section 20 disposable about the shaft shoulder 7, and preferably also about an end portion of the bearing inner ring 4, and a radial section 22 extending radially outwardly from the axial section 20. The outer case 14 has an axial section 26 coupleable with the hub 3 and a radial section 28 extending radially inwardly from the axial section 26 of the outer case 14 and spaced axially from the radial section 22 of the inner case 12. Further, the elastomeric seal member 16 is attached to the radial section 28 of the outer case 14 and has an annular primary sealing lip 17 sealingly engaged with the axial section 22 of the inner case 12.

Referring to FIGS. 1-4, the annular positioner 18 has a centerline 19 and a radial section 30 engageable with the axial end 4a of the bearing inner ring 4 so that the inner case 12 is located at the desired axial position $P_{AI}$. Specifically, the positioner 18 is sized and formed, and arranged on the inner case 12, such that as the seal assembly 10 is displaced axially during installation (as discussed below), the positioner radial section 30 moves into contact with the axial end 4a of the bearing inner ring 4. The inner case 12 of the seal assembly 10 is then located axially as desired relative to the bearing 1. By using the positioner 18 to position the inner case 12, as opposed to establishing the desired inner case position by the location of the outer case 14, the seal assembly 10 may be formed without a rigid bumper or with a bumper sized to be spaced axially from the inner case 12, as described below. The elimination of bumper contact between the inner and outer cases 12, 14 results in a substantially reduced frictional forces within the seal assembly 10 during rotation of the shaft/axle 2 or the hub 3.

Figure 4:
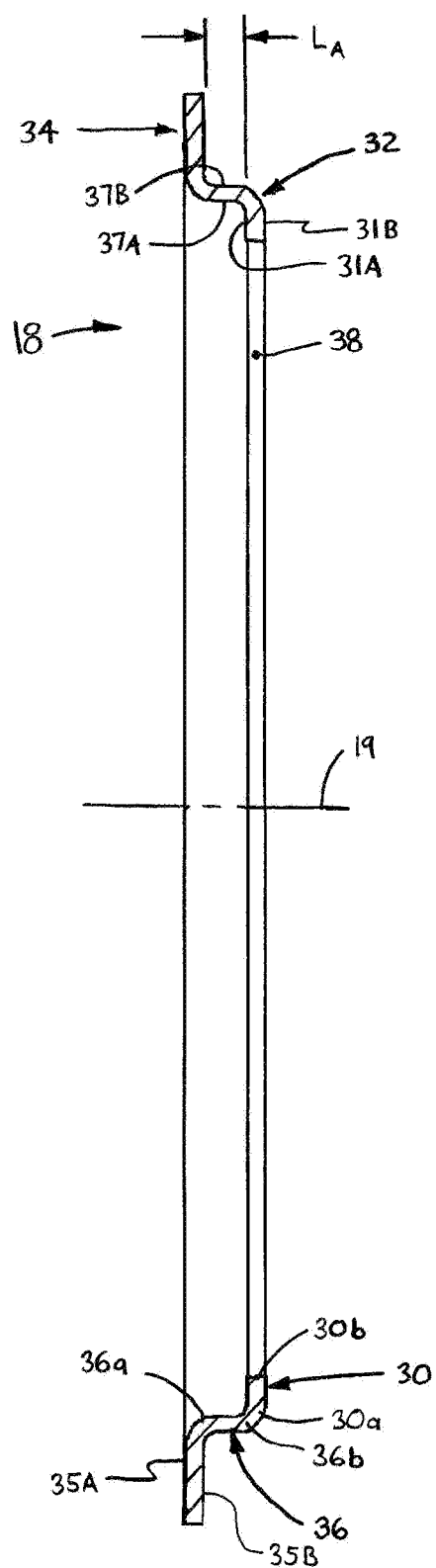
FIG. 4 is an axial cross-sectional view of a positioner of the seal assembly.

Further, the positioner 18 is intended to provide a simple, relatively low cost "retrofit" or adaptor for use with existing unitized seal assemblies, preferably in combination with minor modifications to the existing seal design, as described below. As best shown in FIG. 4, the positioner 18 is preferably generally formed as a circular hub 32 providing the radial section 30 and including another, outwardly extending radial section or radial flange 34, and is preferably formed as a metal stamping (e.g., of low carbon steel).

Figure 2:
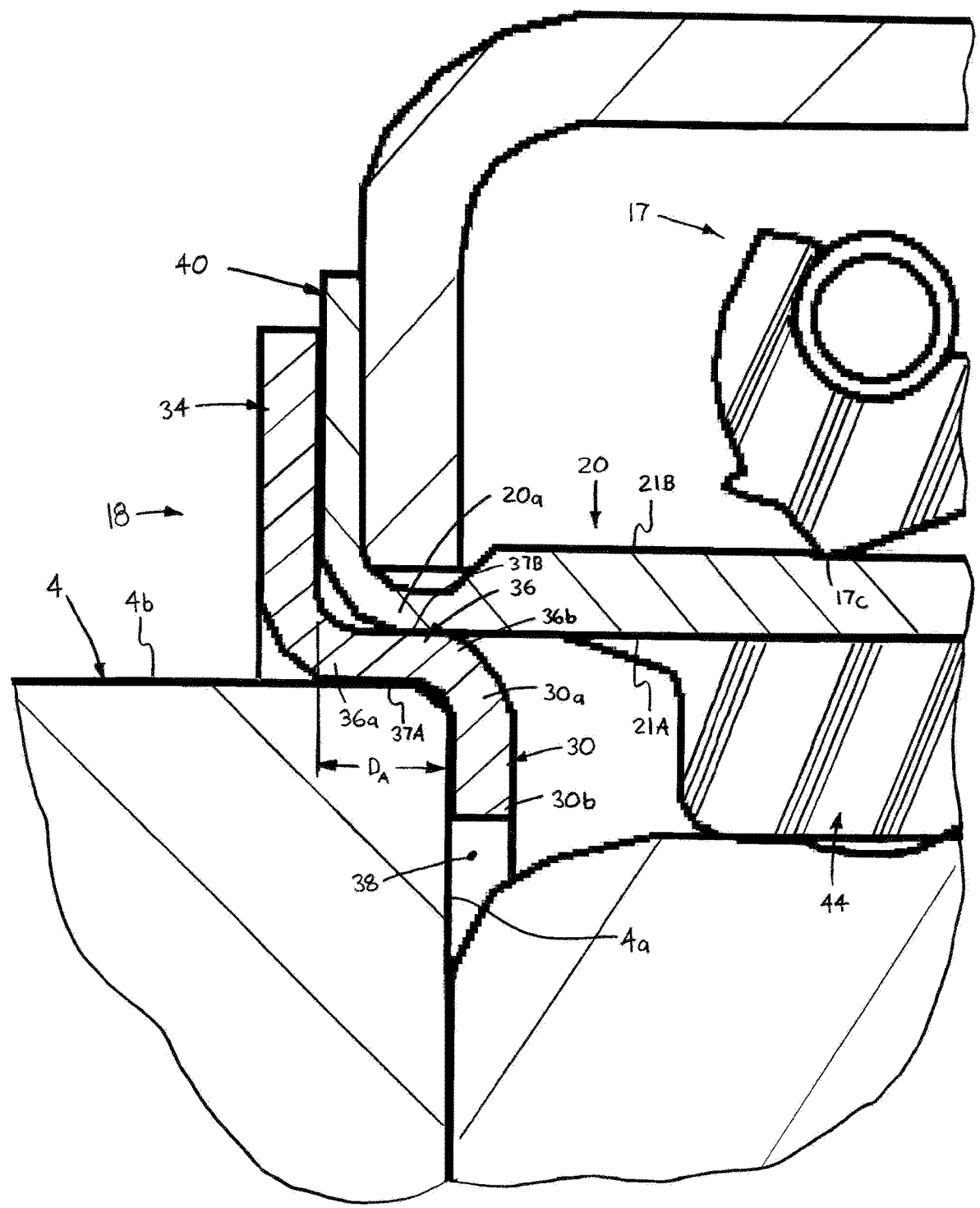
FIG. 2 is a broken-away, enlarged view of a portion of FIG. 1.
Figure 3:
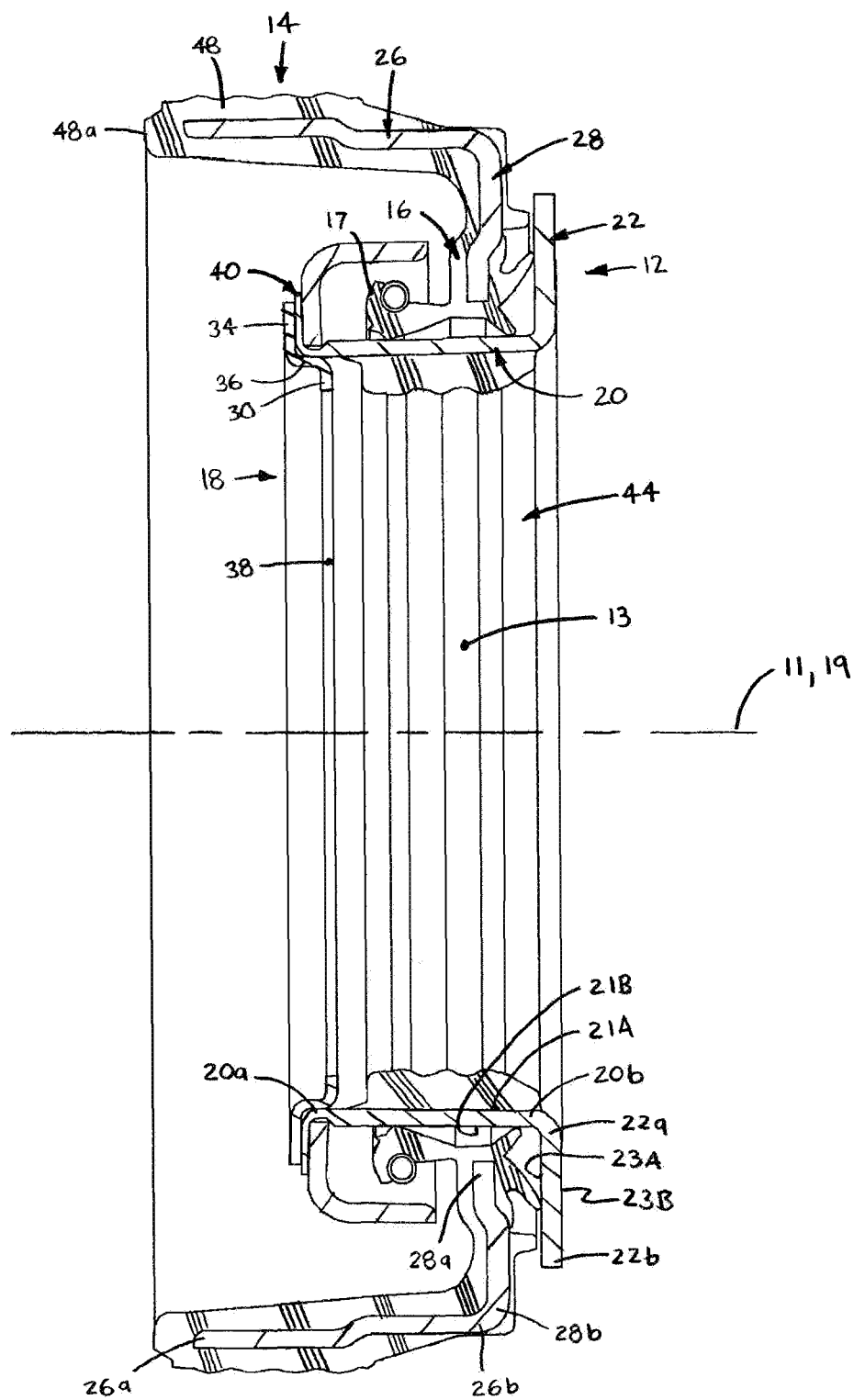
FIG. 3 is an axial cross-sectional view of the seal assembly, shown separate from the shaft-hub assembly.
Figure 5:
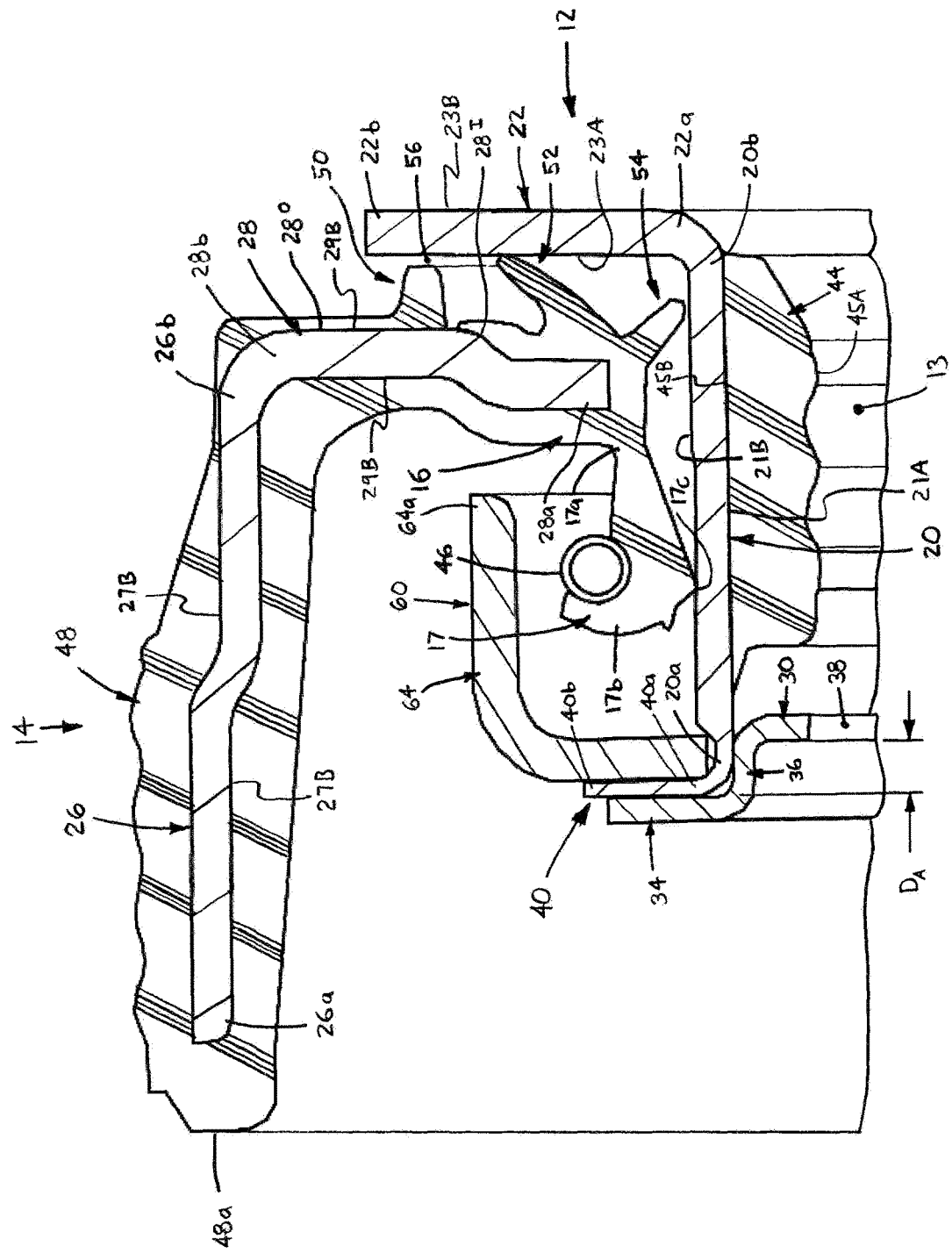
FIG. 5 is a broken-away, enlarged axial cross-sectional view of an upper portion of the seal assembly.

More specifically, the annular positioner 18 includes an axial section 36 having inner and outer circumferential surfaces 37A, 37B, respectively, and opposing inner and outer axial ends 36a, 36b, respectively. The radial section 30 of the positioner 18 extends radially inwardly from the outer axial end 36b of the axial section 36, such that the two sections 30, 36 form the circular hub 32. The axial section 36 has an axial length $L_A$ (FIG. 4) selected to locate the radial section 30 at a predetermined axial distance $D_A$ (FIG. 2) from the inner end 20a of the inner case axial section 20, as indicated in FIGS. 2 and 5. Thereby, engagement of the positioner radial section 30 with the axial end 4a of the bearing inner ring 4 locates the inner case 12 at the desired position $P_{AI}$, while the inner circumferential surface 37B of the positioner axial section 36 preferably frictionally engages an outer circumferential surface 4b of the bearing inner ring 4.

Further, the positioner radial section 30 has an outer radial end 30a integrally formed with the outer axial end 36b of the axial section 36, an inner radial end 30b, and opposing inner and outer radial end surfaces 31A, 31B. The inner radial end 30b of the radial section 30 defines a central bore 38 sized to receive the shoulder 7 of the shaft 2, preferably with clearance as depicted. Also, the other radial section or radial flange 34 extends radially outwardly from the inner axial end 36a of the positioner axial section 36 and has opposing first and second radial end surfaces 35A, 35B, respectively.

With the above structure, the positioner 18 is coupled or attached to the remainder of the seal assembly 10, specifically the inner case 12, generally as follows. The positioner 18 is positioned adjacent to an inner axial end 20a of the inner case axial section 20. The positioner 18 is then displaced along a centerline 11 of the seal assembly 10 such that the hub 32 enters a central bore 13 of the inner case axial section 20 and is further displaced until the outer radial flange 34 of the positioner 18 is disposed against the inner case 12, specifically against another radial section 40 of the inner case 12 as described below. The positioner axial section 36 is diametrically sized such that the outer circumferential surface 37B of the axial section 36 is frictionally engaged with an inner circumferential surface 21A of the inner case axial section 20, to thereby couple or retain the positioner 18 with the inner case 12. However, the positioner 18 may be coupled with the inner case 12 by any other appropriate means, such as for example, by an adhesive, with fasteners, threaded engagement, etc.

Thus, the positioner 18 provides a simple means for adapting or retrofitting a currently known seal assembly, without the need for complex and expensive tooling changes to alter the inner case structure, which enables other modifications to improve seal assembly performance, as described below. Having described the basic structure and function of the seal assembly 10 above, these and other features of the present invention are described in further detail below.

Figure 6:
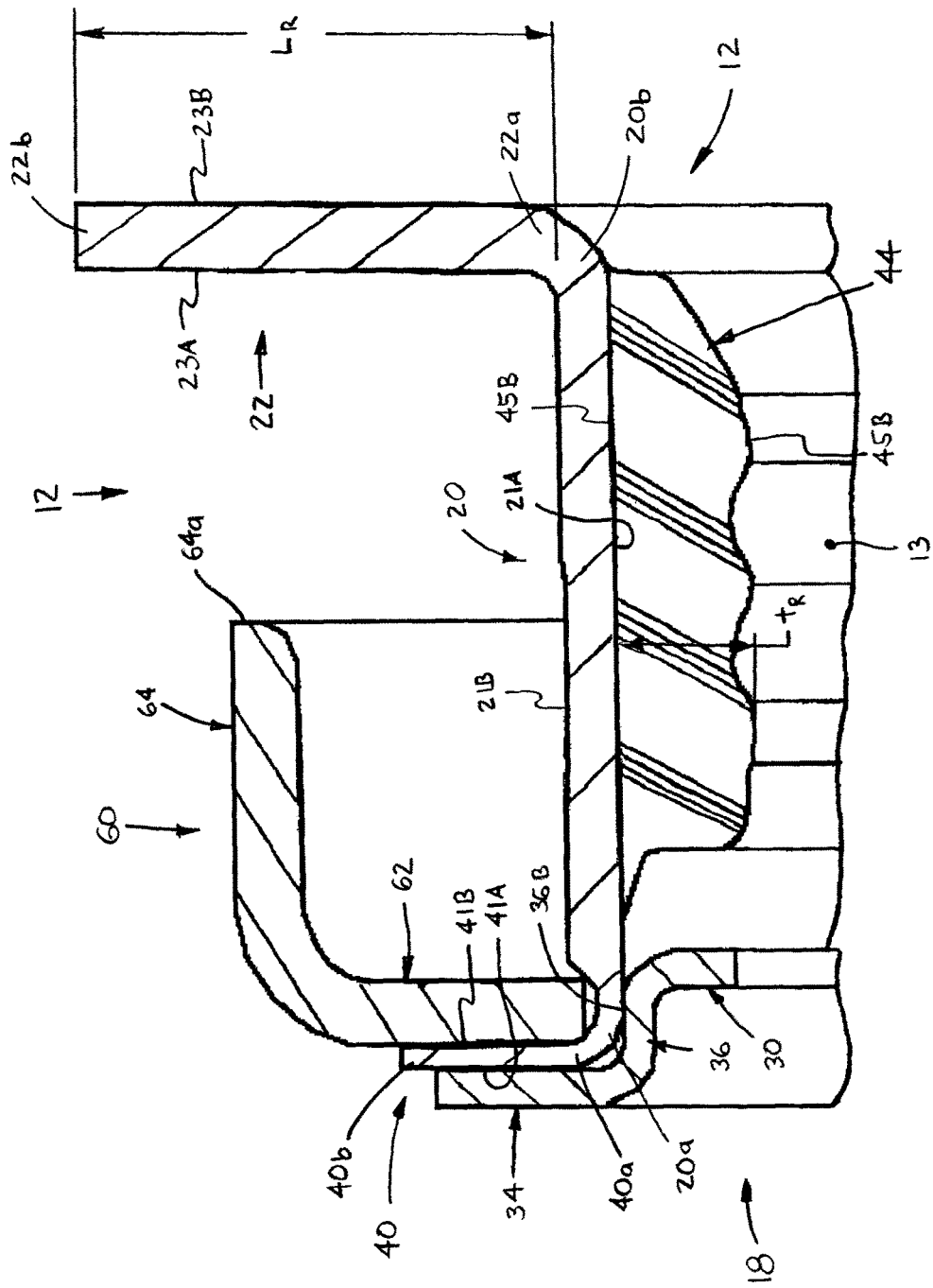
FIG. 6 is a broken-away, axial cross-sectional view of radially inner components of the seal assembly of FIG. 5.

Referring to FIGS. 5 and 6, the inner case 12 preferably has generally C-shaped axial cross-sections and further includes another radial section 40 extending radially-outwardly from the inner end 20a of the inner case axial section 20. More specifically, the axial section 20 of the inner case 12 has inner and outer axial ends 20a, 20b, respectively, and inner and outer circumferential surfaces 21A, 21B, respectively. The inner circumferential surface 21A defines the central bore 13 of the inner case 12 and the outer circumferential surface 21B provides an engagement surface for the primary sealing lip 17. Further, the inner axial end 20a of the axial section 20 is disposed about or adjacent to the axial end 4a of the bearing inner ring 4, the "primary" radial section 22 of the inner case 12 extending radially outwardly from the outer axial end 20b and the other or "secondary" radial section 40 extends radially outwardly from the inner axial end 20a.

The primary radial section 22 of the inner case 12 has an inner radial end 22a integrally formed with the outer axial end 20b of the axial section 20, a free outer radial end 22b, and opposing first and second radial surfaces 23A, 23B. The radial section 22 has a radial length $L_R$ (FIG. 6) sized to radially overlap only a radially-inner portion $28^I$ of the radial section 28 of the outer case 14, as indicated in FIG. 5. As such, a radially-outer portion $28^O$ of the outer case radial section 28 is open or exposed so as to be engageable by an installation tool T (FIG. 10) to axially displace the outer case 14 relative to the inner case 12, as described below. Further, the other or secondary radial section 40 has an inner radial end 40a integrally formed with the inner axial end 20a of the axial section 20, a free, outer radial end 40b, an opposing first and second radial surfaces 41A, 41B, respectively. When the positioner 18 is coupled with the inner case 12, the second radial surface 35B of the positioner flange section 34 is disposed against the first radial surface 41B of the secondary radial section 40.

Preferably, the seal assembly 10 further comprises an inner annular elastomeric member 44 having an inner circumferential 45A surface frictionally engageable with the outer circumferential surface 7a of the shaft shoulder 7 and an outer circumferential surface 45B attached to the inner circumferential surface 21A of the inner case axial section 20. The inner elastomeric member 44 has a radial thickness $t_R$ (FIG. 6) defined between the inner and outer circumferential surfaces 45A, 45B and sized such that the inner elastomeric member 44 is compressed between the inner case axial section 20 and the shaft shoulder 7.

Figure 7:
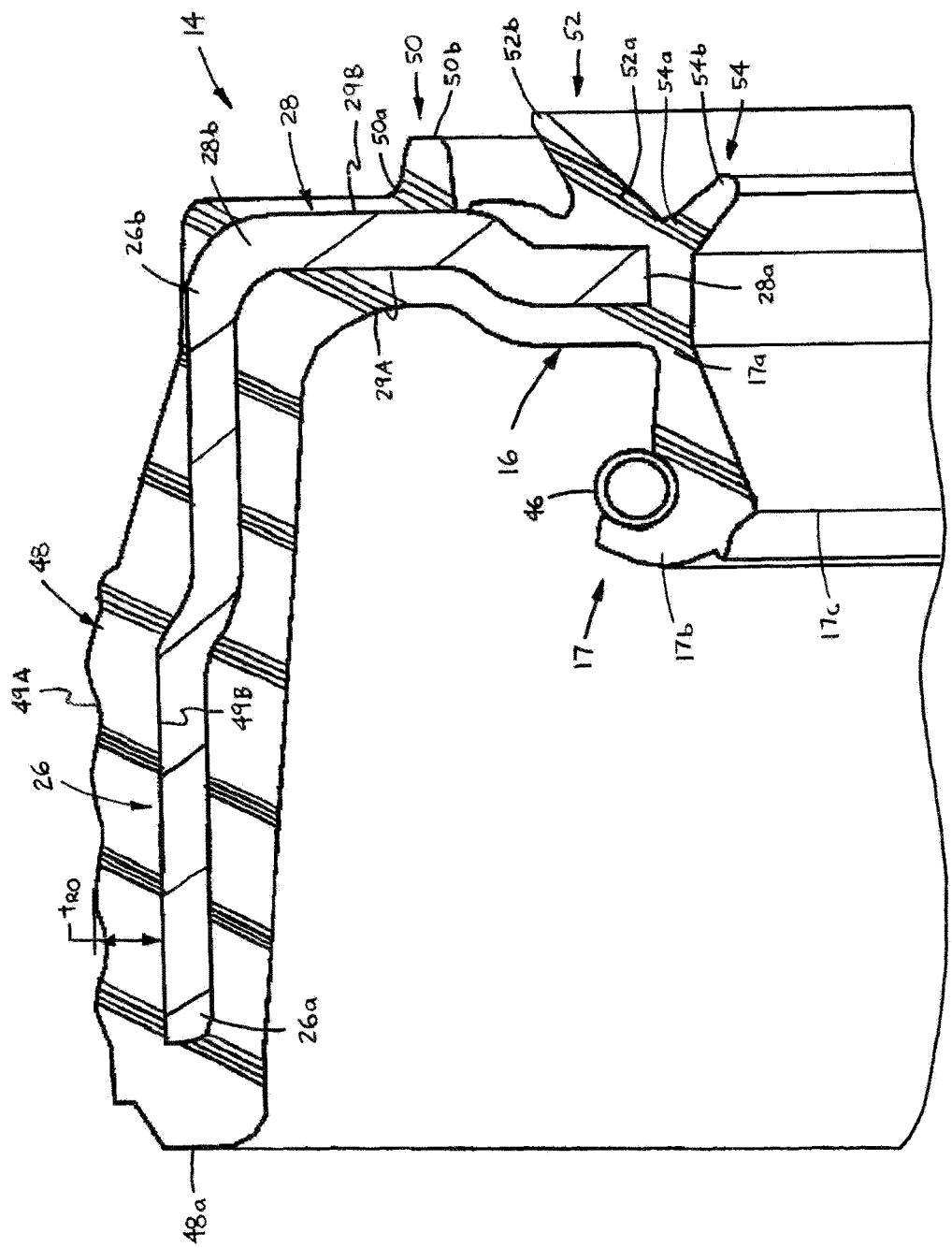
FIG. 7 is a broken-away, axial cross-sectional view of radially outer components of the seal assembly of FIG. 5.

Referring now to FIGS. 5 and 7, the outer case 14 has generally "L-shaped" axial cross-sections and is arranged relative to the inner case 12 such that the radial section 26 of the outer case 14 is disposed axially between the radial sections 22, 40 of the inner case 12. More specifically, the axial section 26 of the outer case 14 has inner and outer axial ends 26a, 26b, respectively and inner and outer circumferential surfaces 27A, 27B, respectively. When the seal assembly 10 is installed between the shaft 2 and the hub 3, the inner axial end 26a of the outer case axial section 26 is preferably disposed against or adjacent to a radial surface 3b of the outer hub 3 (FIG. 1).

Further, the radial section 28 of the outer case 14 extends radially inwardly from the outer axial end 26b of the outer case and is disposed axially between the inner and outer axial ends 20a, 20b of the inner case axial section 20, and thus between the inner case radial sections 22, 40. The outer case radial section 28 has inner and outer radial ends 28a, 28b, and opposing first and second radial surfaces 29A, 29B. The outer radial end 28b is integrally formed with the outer axial end 26b of the axial section 26 and the free, inner end 28a is spaced radially outwardly from the inner case axial section 20. The second radial surface 29B of the outer case radial section 28 faces generally toward and is spaced axially apart from the first radial surface 23A of the primary radial section 22 of the inner case 12.

Preferably, an outer annular elastomeric member 48 is disposed about the outer case 14 and frictionally couples the outer case with the hub 3. Specifically, the outer elastomeric member 48 has an outer circumferential surface 49A frictionally engageable with an inner circumferential surface 3a of the hub 3 and an inner circumferential surface 49B attached to the outer circumferential surface 27A of the outer case axial section 26. The outer elastomeric member 48 has a radial thickness $t_{RO}$ (FIG. 7) defined between the outer and inner circumferential surfaces 48A, 49B, which is sized such that the outer elastomeric member 48 is compressed between the outer case axial section 26 and the hub 3. Further, the elastomeric member 48 has a radial end 48a contactable with the radial surface 3b of the hub 3 so as to locate the outer case 14 at a desired axial position $P_{AO}$ relative to the bearing 1, as shown in FIG. 1 and discussed in further detail below.

Still referring to FIGS. 5 and 7, with the preferred arrangement of the inner and outer cases 12, 14 as described above, the primary sealing lip 17 of the seal member 16 extends generally axially from the radial section 28 of the outer case 14 and toward the inner axial end 20a of the inner case axial section 20. The primary sealing lip 17 has a first end 17a integral with a remainder of the seal member 16 and a second, free end 17b providing an inner circumferential sealing edge 17c. Preferably, the sealing lip 17 has generally wedge-shaped axial cross-sections, with a radial thickness that increases from the inner end 17a and toward the outer end 17b. Further, a garter spring 46 is preferably disposed about the primary sealing lip 17 so as to bias the sealing edge 17c radially-inwardly against the outer circumferential surface 21B of the inner case axial section 20.

Figure 8:
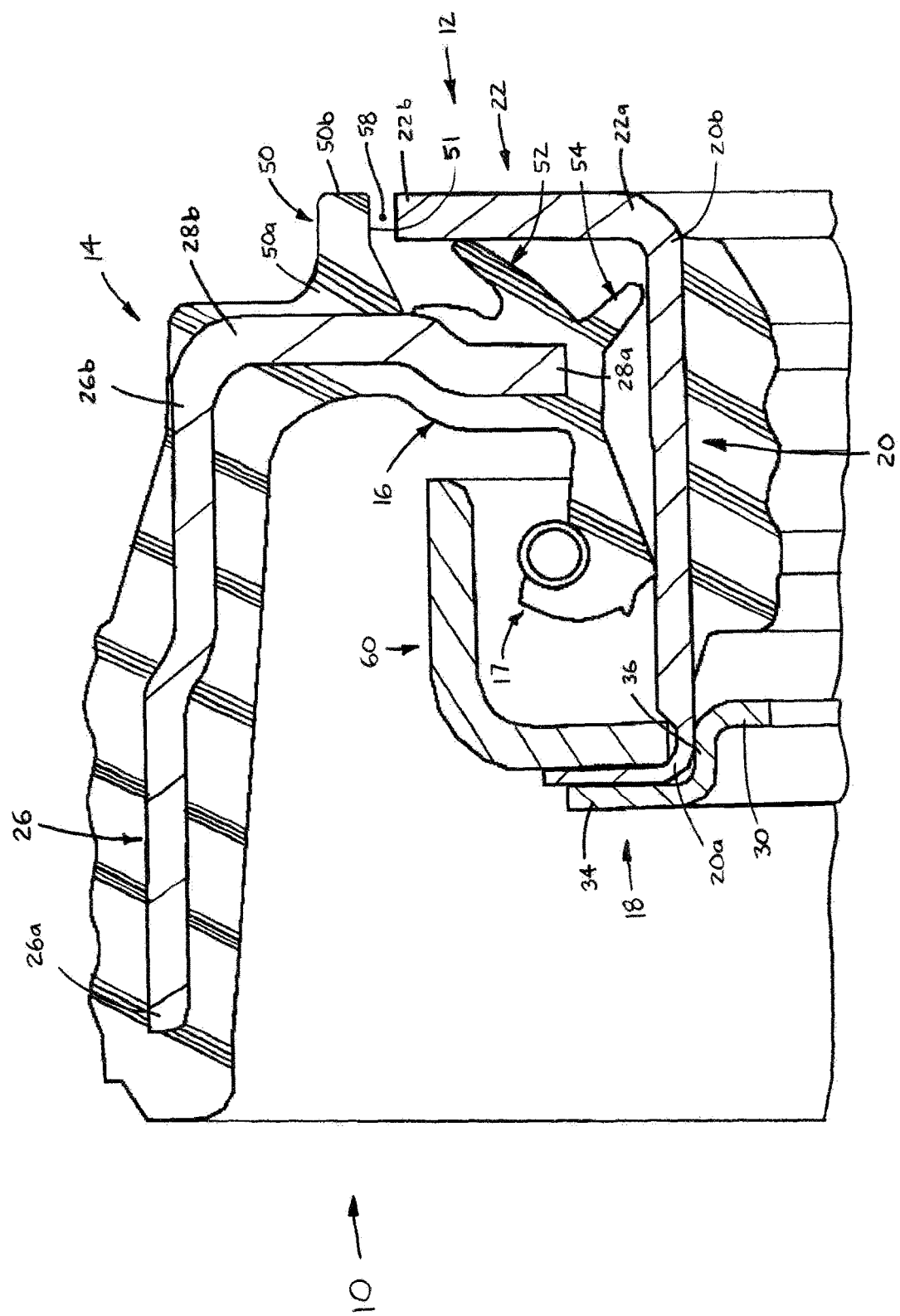
FIG. 8 is a broken-away, axial cross-sectional view of an upper portion of an alternative construction of the seal assembly.

Referring to FIGS. 1, 5 and 7, the seal assembly 10 preferably further comprises an annular elastomeric bumper 50, an annular elastomeric lip 52 sealingly engageable with the primary radial section 22 of the inner case 12 and a radial dust lip 54. The elastomeric bumper 50 has a first axial end 50a attached to the radial section 28 of the outer case 14 and a second, free end 50b spaced axially from the radial section 22 of the inner case 12 so as to define an axial labyrinth gap 56 (FIG. 5). Alternatively, the bumper 50 may be sized and positioned relative to the inner case radial section 22 so as to define a radial labyrinth gap 58 between an inner circumferential surface 51 of the bumper 50 and the outer radial end 22b of the inner case radial section 22, as shown in FIG. 8.

Further, the annular lip 52 has a first end 52a attached to the radial section 28 of the outer case 14 and a second, free end 52b sealingly engageable with the radial section 22 of the inner case 12, and is preferably generally flexible so as to minimize sealing pressure against the inner case 12. The dust lip 54 has an outer radial end 54a attached to the outer case radial section 28 and a free, inner radial end 54b spaced radially outwardly from, or alternatively engageable with, the outer circumferential surface 21B of the inner case axial section 20. Preferably, the annular lip 52 and the dust lip 54 are provided as integral portions of the seal member 16 as depicted, but may alternatively be provided as separate elastomeric members attached or molded to the outer case 14.

Referring to FIGS. 1, 5 and 6, in order to "unitize" the seal assembly 10, i.e., to couple the various seal components so as to be transported and assembled generally as a single unit, the seal assembly 10 preferably further comprises an annular retainer member 60 coupled with the inner case 12. The retainer member 60 preferably has a radial section 62 coupled with the inner case axial section 20 and an axial section 64 disposed radially about a portion of the inner case axial section 20. The retainer axial section 64 is spaced radially outwardly from at least a portion of the primary sealing lip 17 and has an axial end 64a spaced axially from the radial section 28 of the outer case 14. As such, the outer case radial section 28 is disposed axially between the retainer member 60 and the inner case radial section 22, to thereby retain the inner case 12 disposed within the outer case 14. That is, by locating the outer case radial section 28 axially between the retainer member 60 and the radial section 22 of the inner case 12, any relative displacement between the inner and outer cases 12, 14 causes the outer case radial section 28 to contact either the retainer 60 or the inner case radial section 22, thereby maintaining the cases 12, 14 generally connected.

Figure 9:
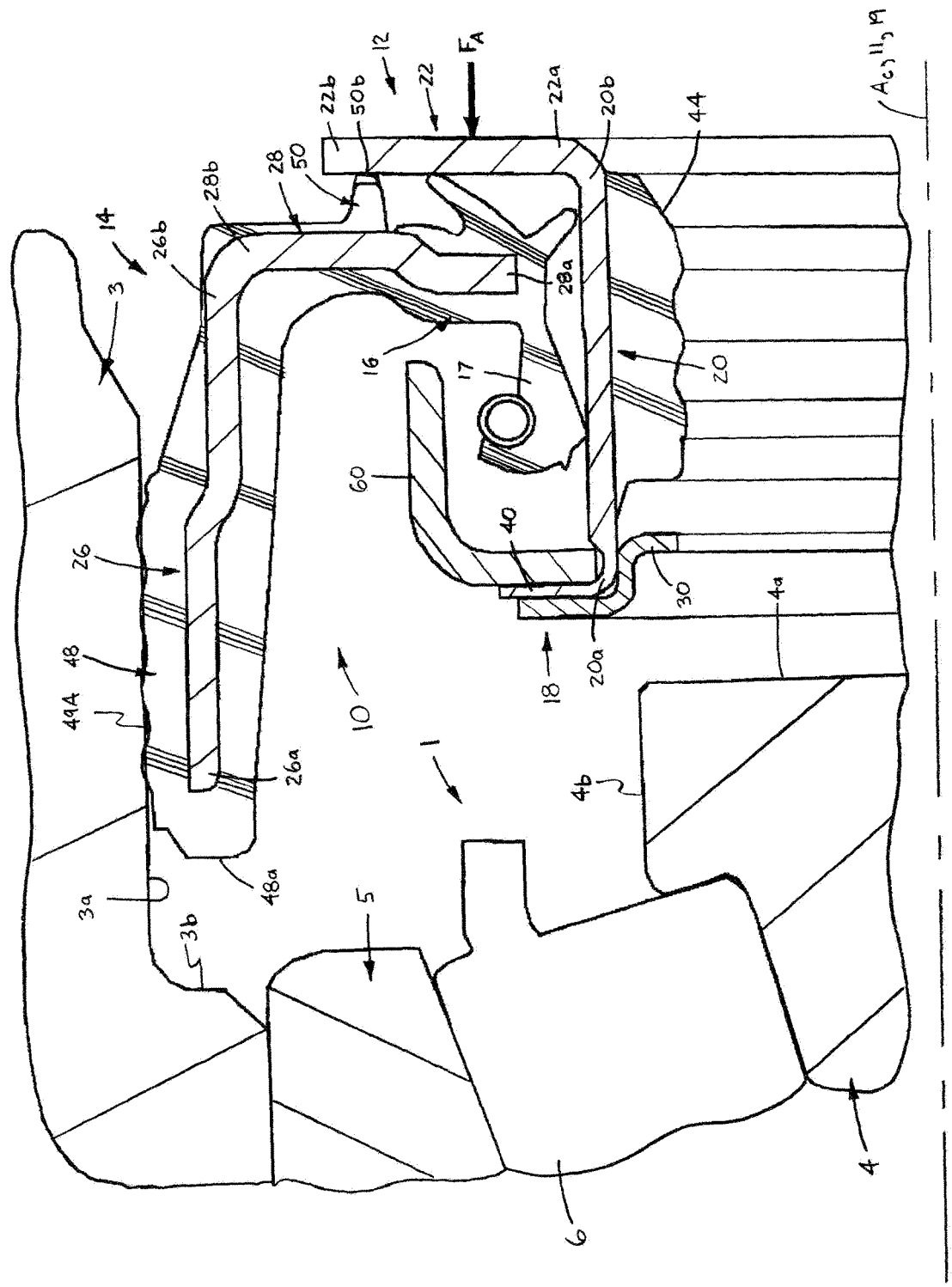
FIG. 9 is a broken-away axial cross-sectional view of the upper portion of the seal assembly, shown at an initial position during installation of the seal assembly.
Figure 10:
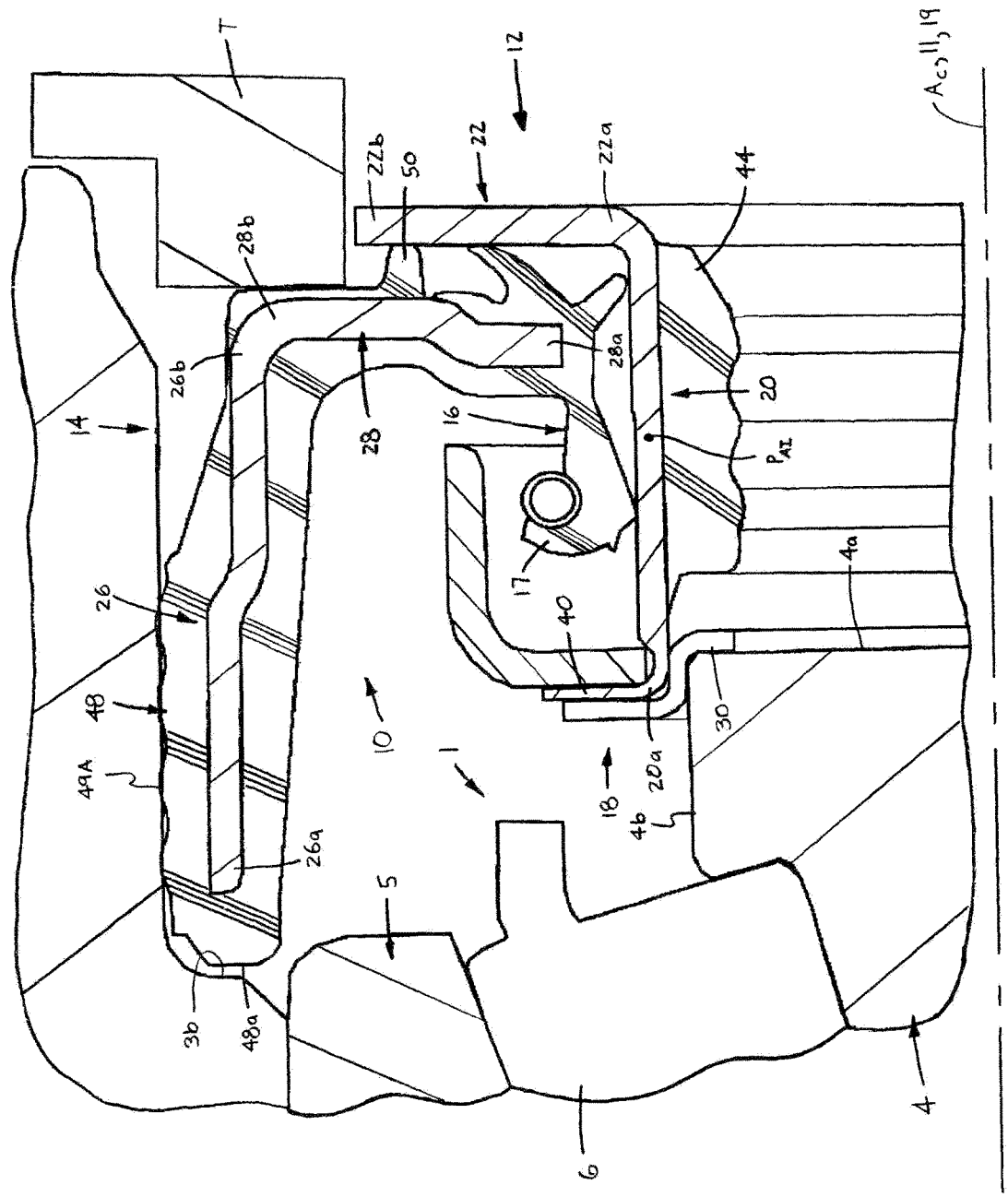
FIG. 10 is a broken-away axial cross-sectional view of the upper portion of the seal assembly, shown at an intermediate position during installation of the seal assembly

Referring to FIGS. 1, 2, 9 and 10, the seal assembly 10 is installed onto the bearing 4 and within the hub 3, prior to installation of the shaft 2, generally as follows. First, the seal assembly 10 is installed within the hub 3 by applying an axial force FA to the radial section 22 of the inner case 12, such that the force FA is transferred to the outer case 14 through the bumper 50, so that the outer surface 49A of the outer elastomeric member 48 slides against the inner circumferential surface 3a of the hub 3, as indicated in FIG. 9. The entire seal assembly 10 displaces axially until the radial section 30 of the positioner 18 becomes disposed against the axial end 4a of the bearing inner ring 4, as shown in FIG. 10, such that the inner case 12 is located at the desired axial position $P_{AI}$. Then, a tool T engages with the radially-outer portion $28^O$ of the outer case radial section 28 to displace the outer case 14 axially relative to the inner case 12. The outer case 14 displaces until the axial end 48a of the outer elastomeric member 48 contacts the radial surface 3b of the hub 3, such that the outer case 14 is then located at the desired axial position $P_{AO}$ (FIG. 1). When both cases 12, 14 are disposed at their respective desired axial positions $P_{AI}$, $P_{AO}$, the free end 50b of the elastomeric bumper 50 is spaced from the inner case radial section 22, thereby substantially reducing frictional forces generated during relative rotation of the inner and outer cases 12, 14. The shaft 2 may then be inserted through the inner case bore 13 and thereafter through the bearing inner ring 4 to rotatably couple the shaft 2 with the hub 3.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A seal assembly for sealing a bearing disposed between an inner shaft and an outer hub, the shaft or hub being rotatable about a central axis, the bearing having an inner ring with an axial end and an outer ring, the shaft having a shoulder disposed against the axial end of the bearing inner ring, the seal assembly comprising:
    an annular inner case having an axial section disposable about the shaft shoulder and a radial section extending radially outwardly from the axial section;
    an annular outer case disposed about the inner case, having an axial section coupleable with the hub and a radial section extending radially inwardly from the axial section of the outer annular case and spaced axially from the radial section of the inner case;
    an elastomeric seal member attached to the radial section of the outer case and having an annular primary sealing lip sealingly engaged with the axial section of the inner case; and
    an annular positioner coupled with the inner case and having a radial section engageable with the axial end of the bearing inner ring so as to locate the inner case at a desired position along the central axis;
    wherein the inner case axial section has an inner circumferential surface and the annular positioner has an axial section with an outer circumferential surface frictionally engaged with the inner circumferential surface of the inner case axial section to couple the positioner with the inner case, the radial section of the positioner extending radially inwardly from the axial section of the positioner.

2. The seal assembly as recited in claim 1 wherein the positioner axial section has opposing inner and outer axial ends, the positioner radial section extends radially inwardly from the outer axial end and the positioner further includes another radial section extending radially outwardly from the inner axial end of the positioner axial section and disposed against an inner axial end of the inner case axial section.

3. The seal assembly as recited in claim 2 wherein the axial section of the positioner has an axial length selected to locate the radial section of the positioner at a predetermined axial distance from the axial end of the inner case axial section.

4. The seal assembly as recited in claim 1 wherein the inner case defines a central bore and the positioner includes a circular hub disposed within the inner case bore and a radial flange disposed against an axial end of the inner case.

5. The seal assembly as recited in claim 1 wherein the radial section of the positioner has an inner radial end defining a central bore sized to receive the shoulder of the shaft.

6. The seal assembly as recited in claim 1 wherein:
    the axial section of the inner case has inner and outer axial ends, the inner end being configured to be disposed about or adjacent to the first axial end of the bearing inner ring and the radial section of the inner case extending radially outwardly from the outer axial end;
    the axial section of the outer case has an inner axial end and an outer axial end, the inner axial end being configured to be disposed against or adjacent to a radial surface of the outer hub and the radial section of the outer case extending radially inwardly from the outer axial end and disposed axially between the inner and outer axial ends of the inner case axial section; and
    the primary sealing lip of the seal member extends generally axially from the radial section of the outer case and toward the inner axial end of the inner case axial section.

7. The seal assembly as recited in claim 6 further comprising an annular retainer member disposed about a portion of the inner case axial section and having an axial section spaced radially outwardly from at least a portion of the primary sealing lip of the seal member, the radial section of the outer case being disposed axially between the retainer member and the inner case radial section so as to retain the inner case disposed within the outer case.

8. The seal assembly as recited in claim 1 further comprising an annular elastomeric bumper having a first axial end attached to the radial section of the outer case and a second, free end spaced from the radial section of the inner case so as to define a labyrinth gap.

9. The seal assembly as recited in claim 1 further comprising an annular elastomeric lip having a first end attached to the radial section of the case and a second end sealingly engageable with the radial section of the inner case.

10. The seal assembly as recited in claim 1 wherein the radial section of the inner case has a radial length sized to radially overlap a radially-inner portion of the radial section of the outer case, a radially-outer portion of the outer case radial section being engageable by an installation tool to axially displace the outer case relative to the inner case.

11. The seal assembly as recited in claim 1 further comprising at least one of:
   an inner annular elastomeric member having an inner circumferential surface frictionally engageable with the outer circumferential surface of the shaft shoulder, an outer circumferential surface attached to an inner circumferential surface of the inner case axial section and a radial thickness defined between the inner circumferential surface and the outer circumferential surface, the radial thickness being sized such that the inner elastomeric member is configured to be compressed between the inner case axial section and the shaft shoulder; and
   an outer annular elastomeric member having an outer circumferential surface frictionally engageable with an inner circumferential surface of the hub, an inner circumferential surface attached to an outer circumferential surface of the outer case axial section and a radial thickness defined between the inner circumferential surface and the outer circumferential surface, the radial thickness being sized such that the outer elastomeric member is configured to be compressed between the outer case axial section and the hub.

12. The seal assembly as recited in claim 1 wherein:
   the primary sealing lip has a first end integral with a remainder of the seal member and a second, free end providing an inner circumferential sealing edge; and
   the seal assembly further comprises a garter spring disposed about the sealing lip so as to bias the sealing edge radially-inwardly against the axial section of the inner case.

13. A seal assembly for sealing a bearing disposed between an inner shaft and an outer hub, the shaft or hub being rotatable about a central axis, the bearing has an inner ring with an axial end and an outer ring, the shaft having a shoulder disposed against the axial end of the bearing inner ring, the seal assembly comprising:
   an annular inner case having an axial section disposable about the shaft shoulder and a radial section extending radially outwardly from the axial section;
   an annular outer case disposed about the inner case, having an axial section coupleable with the hub and a radial section extending radially inwardly from the axial section of the outer case and spaced axially from the radial section of the inner case;
   an elastomeric seal member attached to the radial section of the outer case and having an annular primary sealing lip sealingly engaged with the axial section of the inner case;
   an annular elastomeric bumper having a first end attached to the radial section of the outer case and a second, free end spaced from the radial section of the inner case so as to form a labyrinth gap; and
   an annular positioner coupled with the inner case and having a radial section engageable with the axial end of the bearing inner ring so as to locate the inner case at a desired position along the central axis;
   wherein the radial section of the inner case has a radial length sized to radially overlap a radially-inner portion of the radial section of the outer case, a radially-outer portion of the outer case radial section being engageable by an installation tool to axially displace the outer case relative to the inner case;
   wherein the inner case axial section has an inner circumferential surface and the annular positioner has an axial section with an outer circumferential surface frictionally engaged with the inner circumferential surface of the inner case axial section to couple the positioner with the inner case, the radial section of the positioner extending radially inwardly from the axial section of the positioner.

14. The seal assembly as recited in claim 13 wherein the positioner axial section has opposing inner and outer axial ends, the positioner radial section extends radially inwardly from the outer axial end and the positioner further includes another radial section extending radially outwardly from the inner axial end of the positioner axial section and disposed against an inner axial end of the inner case axial section.

15. The seal assembly as recited in claim 13 wherein the axial section of the positioner has an axial length selected to locate the radial section of the positioner at a predetermined axial distance from the axial end of the inner case axial section.

16. The seal assembly as recited in claim 13 wherein the inner case defines a central bore and the positioner includes a circular hub disposed within the inner case bore and a radial flange disposed against an axial end of the inner case.

17. The seal assembly as recited in claim 13 wherein:
   the axial section of the inner case has inner and outer axial ends, the inner end being configured to be disposed about or adjacent to the first axial end of the bearing inner ring and the radial section of the inner case extending radially outwardly from the outer axial end;
   the axial section of the outer case has an inner axial end and an outer axial end, the inner axial end being configured to be disposed against or adjacent to a radial surface of the outer hub and the radial section of the outer case extending radially inwardly from the outer axial end and disposed axially between the inner and outer axial ends of the inner case axial section; and
   the primary sealing lip of the seal member extends generally axially from the radial section of the outer case and toward the inner axial end of the inner case axial section.

18. The seal assembly as recited in claim 17 further comprising an annular retainer member disposed about a portion of the inner case axial section and having an axial section spaced radially outwardly from at least a portion of the primary sealing lip of the seal member, the radial section of the outer case being disposed axially between the retainer member and the inner case radial section so as to retain the inner case disposed within the outer case.

* * * * *